US012610142B2

(12) United States Patent
Shree

(10) Patent No.: US 12,610,142 B2
(45) Date of Patent: Apr. 21, 2026

(54) METHODS, STORAGE MEDIA, AND SYSTEMS FOR DETECTING A PERSISTING OR SUSTAINED BLUR CONDITION

(71) Applicant: Hover Inc., San Francisco, CA (US)

(72) Inventor: Atulya Shree, Mountain View, CA (US)

(73) Assignee: Hover Inc., San Francisco, CA (US)

( * ) Notice: Subject to any disclaimer, the term of this patent is extended or adjusted under 35 U.S.C. 154(b) by 90 days.

(21) Appl. No.: 18/603,910

(22) Filed: Mar. 13, 2024

(65) Prior Publication Data

US 2024/0314432 A1 Sep. 19, 2024

Related U.S. Application Data

(60) Provisional application No. 63/564,336, filed on Mar. 12, 2024, provisional application No. 63/491,015, filed on Mar. 17, 2023.

(51) Int. Cl.
*H04N 23/68* (2023.01)
*H04N 23/63* (2023.01)

(52) U.S. Cl.
CPC .......... *H04N 23/683* (2023.01); *H04N 23/63* (2023.01); *H04N 23/6812* (2023.01)

(58) Field of Classification Search
CPC ... H04N 23/683; H04N 23/63; H04N 23/6812
See application file for complete search history.

(56) References Cited

U.S. PATENT DOCUMENTS

| | | | | |
|---|---|---|---|---|
| 9,824,232 B1* | 11/2017 | Carmack | ................. | G06F 21/16 |
| 2004/0218055 A1* | 11/2004 | Yost | .................... | H04N 1/00183 |
| | | | | 348/208.6 |
| 2006/0170781 A1* | 8/2006 | Sobol | ..................... | H04N 23/68 |
| | | | | 348/208.4 |
| 2014/0267618 A1 | 9/2014 | Esteban et al. | | |
| 2014/0320679 A1 | 10/2014 | Lammers et al. | | |
| 2016/0330374 A1 | 11/2016 | Ilic et al. | | |
| 2020/0162629 A1 | 5/2020 | Ilic et al. | | |
| 2021/0150735 A1 | 5/2021 | Elg et al. | | |
| 2022/0114740 A1 | 4/2022 | Shimizu et al. | | |
| 2024/0281996 A1* | 8/2024 | Nandipati | .......... | H04N 23/6812 |

OTHER PUBLICATIONS

PCT International Search Report and Written Opinion dated Jun. 14, 2024 for PCT/US2024/019863, 14 pages.

* cited by examiner

*Primary Examiner* — Christopher K Peterson

(57) ABSTRACT

The disclosure relates to methods, storage media, and systems of detecting a persisting or sustained blur condition across 2D image frames captured for a 3D reconstruction pipeline. It may include receiving a plurality of image frames captured by a camera of a capture device, receiving sensor data of the capture device, detecting, based on the sensor data of the capture device, a blur condition for at least a threshold number of image frames within a capture window, responsive to detecting the blur condition, providing an augmentation for at least one image frame of the plurality of image frames based on the sensor data, applying the augmentation to the at least one image frame of the plurality of image frames, and displaying, on a display of the capture device, the at least one augmented image frame.

21 Claims, 5 Drawing Sheets

300

302B

304B

Please slow down

METHODS, STORAGE MEDIA, AND SYSTEMS FOR DETECTING A PERSISTING OR SUSTAINED BLUR CONDITION

CROSS REFERENCE TO RELATED APPLICATIONS

The present application claims priority to provisional patent application 63/564,336 entitled "METHODS, STORAGE MEDIA, AND SYSTEMS FOR DETECTING A PERSISTING OR SUSTAINED BLUR CONDITION" filed Mar. 12, 2024, and provisional patent application 63/491,015 entitled "METHODS, STORAGE MEDIA, AND SYSTEMS FOR AUGMENTING A PLURALITY OF IMAGE FRAMES" filed Mar. 17, 2023, which are hereby incorporated by reference in their entirety and made part of the present application for all purposes.

BACKGROUND

Field of the Disclosure

The present disclosure relates to methods, storage media, and systems detecting a persisting or sustained blur condition, for example across two-dimensional images captured for a three-dimensional reconstruction pipeline.

Brief Description of the Related Art

In the realm of digital photography, capturing clear and sharp images is often challenged by motion blur, which can occur when either the camera or the subject moves during the exposure time of the camera's sensor. Motion blur can significantly degrade the quality of an image, making it difficult to discern fine details. Traditional methods to counteract this issue have included increasing the shutter speed to reduce exposure time, using optical image stabilization (OIS) to mechanically compensate for camera movement, employing digital signal processing techniques to post-process the images in an effort to mitigate the effects of blur, or a combination thereof.

The effectiveness of increasing shutter speed is limited by the available light and the potential for increased noise in the resulting image. Optical image stabilization systems, while beneficial, add complexity and cost to the camera design and are not always effective against all types of motion. Digital signal processing can enhance images after they have been captured, but this often requires significant computational resources and may not always restore the desired level of detail in the image.

The challenge remains to provide a way to utilize sensor data to enhance the quality of captured images in real-time, particularly in portable devices where computational resources, energy efficiency, storage space, and upload bandwidth are critical considerations.

SUMMARY

A prerequisite of many applications that use image frames as input is that the image frames are clear and sharp, or, said differently, not blurry. The images frames are captured by one or more cameras of a capture device. The capture device may be handheld, such as a mobile device, a tablet computer, a headset, and the like. Lighting conditions of an environment of the capture device, movement of the capture device such as translation, rotation, or a combination thereof, the distance between the capture device and the environment, or portions thereof, or combinations thereof, may lead to images that are not clear and sharp, or, said differently, that are blurry.

The techniques described herein have broad applications across various industries where image clarity and sharpness is paramount and the need for real-time processing is critical, such as three-dimensional reconstruction that relies on clear pixels in images for feature detection or matching. These techniques do not require additional hardware, such as stabilization hardware, or image processing. Instead, the techniques disclosed herein leverage the ubiquitous presence of sensors in capture devices to detect blur conditions according to capture device conditions and a capture frame rate, provide augmentation for at least one image frame responsive to the detected blur condition and based on the sensor data, apply the augmentation to the at least one image frame, and display the at least one augmented image frame. The display of the at least one augmented image frame on a display of a capture device provides instantaneous feedback to a user of the capture device enabling the user to take action to mitigate the blur condition. Examples of actions include changing camera functions such as shutter speed, changing user functions such as movement of the capture device for example by changing the degree and/or rate of movement of the capture device, changing scene functions such as lighting conditions of the environment for example by changing brightness of the lights or drawing of window shades, and/or changing scene function such as the distance between the capture device and the environment, or portions thereof, or a combination thereof.

The problem of blur conditions across two-dimensional (2D) image frames captured for a three-dimensional (3D) reconstruction pipeline is solved by detecting a persisting or sustained blur condition during image frame capture according to capture device conditions and a capture frame rate. A blur condition may manifest relative to camera functions (e.g., shutter speed), user functions (e.g., capture device rotation and/or translation), and/or scene functions (e.g., lighting, depth, etc.) that may result in a blurry image. Image processing to determine pixel resolution or sampling quality of visual data for an image frame may be supplanted wholly or in part with sensor data for a capture device relative to a plurality of frames. Detecting a blur condition at time of capture of image frames may be used to prevent blurry images from being stored and used downstream, such as for 3D reconstruction. Responsive to detecting the blur condition, an augmentation may be provided for at least one image frame based on the capture device conditions, the augmentation may be applied to the at least one image frame, and the at least one augmented image frame may be displayed on a display of the capture device. Display of the at least one augmented image frame may convey to a user of the capture device that current camera functions, user functions, and/or scene functions may result in blurry image frames. This may result in a change, by the user, in camera functions, user functions, and/or scene functions in an effort to stop the blur condition from being met. Image frames captured when the blur condition is met or satisfied may be distinguished. A least blurry image frame of the image frames captured when the blur condition is met or satisfied may be stored, for example as a backup. The disclosure addresses what may otherwise be a traditionally subjective process performed by humans into a mathematically structured one, the details of which are disclosed herein. For example, sensor-based techniques disclosed herein replace subjective interpretation by humans to label or classify a plurality of images as meeting a blur condition.

One or more aspects of the present disclosure relate to a method of detecting a persisting or sustained blur condition across 2D image frames captured for a 3D reconstruction pipeline. The method may include receiving a plurality of image frames captured by a camera of a capture device. The plurality of image frames may be captured at a capture frame rate. The method may include receiving sensor data of the capture device. The sensor data may be associated with the plurality of image frames and may be related to the capture frame rate. The method may include detecting, based on the sensor data of the capture device, a blur condition for at least a threshold number of image frames within a capture window. The blur condition and the threshold number of image frames may be proportional to the capture frame rate. Responsive to detecting the blur condition, the method may include providing an augmentation for at least one image frame of the plurality of image frames based on the sensor data. The method may include applying the augmentation to the at least one image frame of the plurality of image frames. The method may include displaying, on a display of the capture device, the at least one augmented image frame.

One or more aspects of the present disclosure relate to one or more non-transitory computer-readable media storing instructions that, when executed by one or more processors of a capture device, cause the capture device to perform a method of detecting a persisting or sustained blur condition across 2D image frames captured for a 3D reconstruction pipeline. The method may include receiving a plurality of image frames captured by a camera of a capture device. The plurality of image frames may be captured at a capture frame rate. The method may include receiving sensor data of the capture device. The sensor data may be associated with the plurality of image frames and may be related to the capture frame rate. The method may include detecting, based on the sensor data of the capture device, a blur condition for at least a threshold number of image frames within a capture window. The blur condition and the threshold number of image frames may be proportional to the capture frame rate. Responsive to detecting the blur condition, the method may include providing an augmentation for at least one image frame of the plurality of image frames based on the sensor data. The method may include applying the augmentation to the at least one image frame of the plurality of image frames. The method may include displaying, on a display of the capture device, the at least one augmented image frame.

One or more aspects of the present disclosure relate to a system for detecting a persisting or sustained blur condition across 2D image frames captured for a 3D reconstruction pipeline. The system may include one or more processors configured to perform or execute one or more steps. The system may include one or more processors configured to perform or execute one or more steps. The processors may be configured to receive a plurality of image frames captured by a camera of a capture device. The plurality of image frames may be captured at a capture frame rate. The processors may be configured to receive sensor data of the capture device. The sensor data may be associated with the plurality of image frames and may be related to the capture frame rate. The processors may be configured to detect, based on the sensor data of the capture device, a blur condition for at least a threshold number of image frames within a capture window. The blur condition and the threshold number of image frames may be proportional to the capture frame rate. Responsive to detecting the blur condition, the processors may be configured to provide an augmentation for at least one image frame of the plurality of image frames based on the sensor data. The processors may be configured to apply the augmentation to the at least one image frame of the plurality of image frames. The processors may be configured to display, on a display of the capture device, the at least one augmented image frame.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of 'a', 'an', and 'the' include plural referents unless the context clearly dictates otherwise.

DETAILED DESCRIPTION

Figure 1:
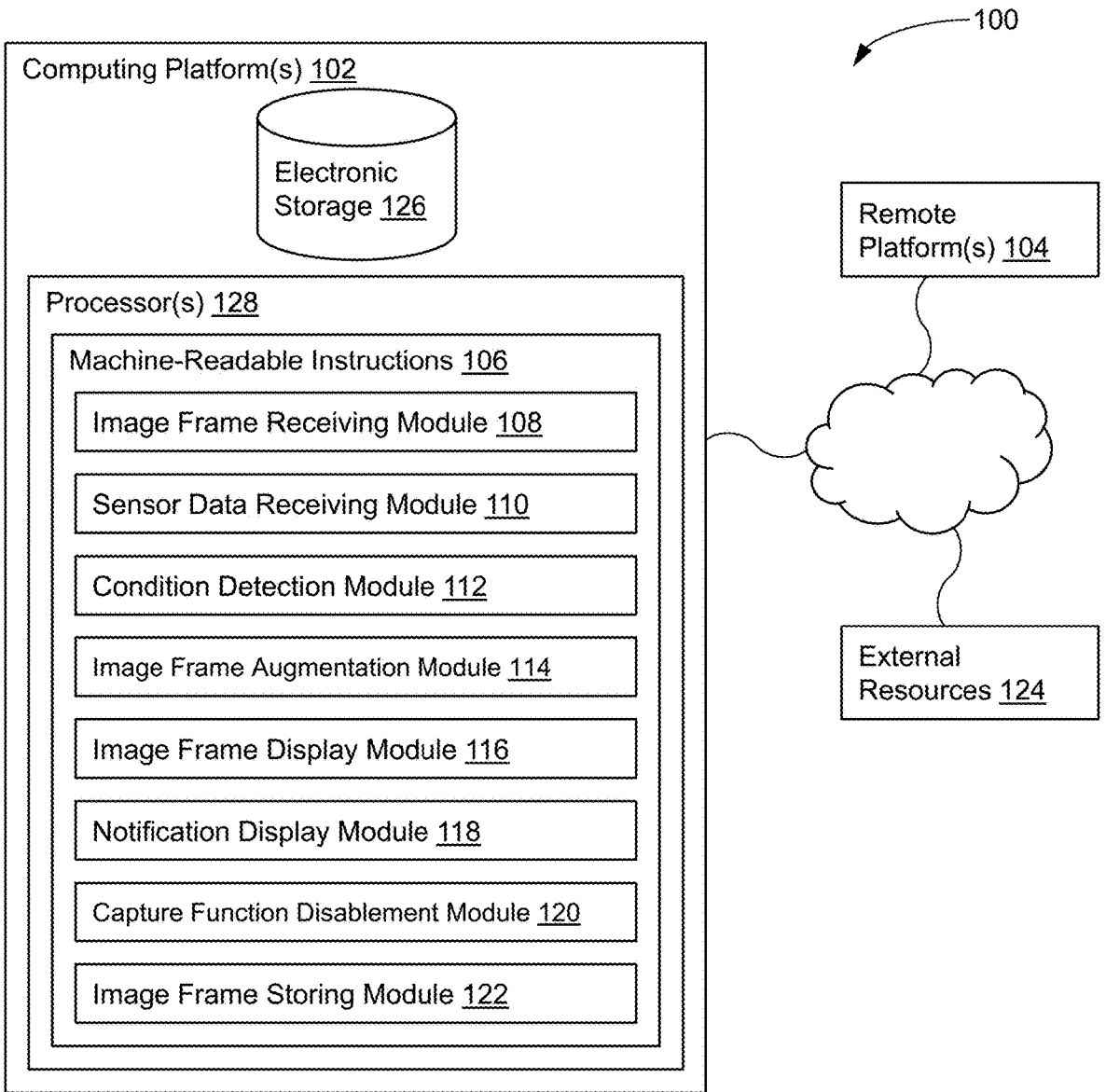
FIG. 1 illustrates a system configured for detecting a persisting or sustained blur condition across two-dimensional (2D) image frames captured for a three-dimensional (3D) reconstruction pipeline, according to some embodiments.

FIG. 1 illustrates a system 100 configured for detecting a persisting or sustained blur condition across two-dimensional (2D) image frames captured for a three-dimensional (3D) reconstruction pipeline, in accordance with one or more implementations. In some implementations, system 100 may include one or more computing platforms 102. Computing platform(s) 102 may be configured to communicate with one or more remote platforms 104 according to a client/server architecture, a peer-to-peer architecture, and/ or other architectures. Remote platform(s) 104 may be configured to communicate with other remote platforms via computing platform(s) 102 and/or according to a client/ server architecture, a peer-to-peer architecture, and/or other architectures. Users may access system 100 via remote platform(s) 104.

Computing platform(s) 102 may be configured by machine-readable instructions 106. Machine-readable instructions 106 may include one or more instruction modules. The instruction modules may include computer program modules. The instruction modules may include one or more of image frame receiving module 108, sensor data receiving module 110, condition detection module 112, image frame augmentation module 114, image frame display module 116, notification display module 118, capture function disablement module 120, image frame storing module 122, and/or other instruction modules.

Image frame receiving module 108 may be configured to receive a plurality of image frames captured by a camera of a capture device. The plurality of image frames may be 2D image frames. The plurality of image frames are captured at a capture frame rate. Examples of capture frame rates include three frames per second (FPS), four FPS, six FPS, eight FPS, twelve FPS, twenty-four FPS, and the like. The capture device may be handheld, such as a smartphone/mobile device, a tablet computer, a headset, and the like.

Sensor data receiving module 110 may be configured to receive sensor data of the capture device. The sensor data is associated with the plurality of image frames and related to the capture frame rate. The sensor data provides necessary information to detect a blur condition. By way of non-limiting example, the sensor data may include at least one of inertial sensor data, accelerometer sensor data, gyroscope sensor data, magnetometer sensor data, light sensor data, camera sensor data, depth data, and the like. The sensor data may be associated with the plurality of image frames. The sensor data may encompass a wide array of measurements from different types of sensors such as inertial measurement units (IMUs), accelerometers, gyroscopes, magnetometers, light sensors, camera sensors, depth sensors, and the like.

Condition detection module 112 may be configured to detect, based on the sensor data, a blur condition for at least a threshold number of image frames within a capture window, where the blur condition and the threshold number of image frames are proportional to the capture frame rate. In other words, condition detection module 112 may determine when a blur condition has persisted for at least a threshold number of image frames within a capture window. A blur condition may manifest relative to camera functions (e.g., shutter speed), user functions (e.g., capture device rotation and/or translation), scene functions (e.g., lighting, depth, etc.), or a combination thereof that may result in a blurry image. Image processing to determine pixel resolution or sampling quality of visual data for an image frame may be supplanted wholly or in part with sensor data for a capture device relative to a plurality of frames. Detecting a blur condition at time of capture of image frames may be used to prevent blurry images from being stored and used downstream, such as for 3D reconstruction.

The threshold number of image frames may be proportional to the capture frame rate. In some examples, if the capture frame rate is twenty-four FPS, the threshold number of image frames may be twelve image frames and the capture window may be twenty-four image frames. In these examples, condition detection module 112 may detect a blur condition for at least twelve image frames within twenty-four image frames (e.g., the last twenty-four image frames). In some examples, if the capture frame rate is three FPS, the threshold number of image frames may be two image frames, and the capture window may be three image frames. In these examples, condition detection module 112 may detect a blur condition for at least two image frames within three image frames (e.g., the last three image frames). In some embodiments, the threshold number of image frames may be different for camera functions, user functions, scene functions, or a combination thereof.

In some embodiments, condition detection module 112 may use correlations between camera functions, user functions, scene functions, or a combination thereof, and image blur to determine a blur condition. In some embodiments, condition detection module 112 may compute image blur for an image using one or more signal processing techniques such as, for example, computing a Fast Fourier Transforms (FFTs) of the image and examining a distribution of low and high frequencies, computing a convolution of a Laplacian kernel across the image and computing a variance of the response, and the like. If the computed image blur is greater than an image blur threshold, condition detection module 112 may classify the image as being blurry.

Condition detection module 112 may detect the blur condition based on shutter speed, a degree of capture device rotation, a rate of capture device rotation, a degree of capture device translation, a rate of capture device translation, scene depth, or a combination thereof. In some embodiments, condition detection module 112 may calculate the shutter speed, the degree of capture device rotation, the rate of capture device rotation, the degree of capture device translation, the rate of capture device translation, the scene depth, or a combination thereof. In these embodiments, condition detection module 112 may detect the blur condition based on an analysis of the shutter speed, the degree of capture device rotation, the rate of capture device rotation, the degree of capture device translation, the rate of capture device translation, the scene depth, or a combination thereof.

Condition detection module 112 may determine, based on the sensor data of the capture device, a shutter speed associated with the plurality of images. Responsive to the shutter speed being slower than a threshold shutter speed for at least the threshold number of image frames within the capture window, condition detection module 112 may detect the blur condition. The threshold shutter speed may be proportional to the capture frame rate. For example, responsive to the shutter speed being slower than ⅟₆₀th of a second, which may be considered a threshold for handheld photography, for at least twelve image frames of twenty-four image frames for a twenty-four FPS capture frame rate, condition detection module 112 may detect a blur condition. In this example, each of the twelve image frames are associated with ⅟₆₀th or slower shutter speed which results in the blur condition.

Condition detection module 112 may determine, based on the sensor data of the capture device, a degree of capture device rotation associated with the plurality of image frames. In some embodiments, responsive to the degree of capture device rotation being greater than a first threshold degree of capture device rotation, less than a second threshold degree of capture device rotation, or a combination thereof, for at least the threshold number of image frames within the capture window, condition detection module 112 may detect a blur condition. For example, responsive to a degree of capture device rotation being greater than thirty degrees for at least twelve image frames of twenty-four image frames for a twenty-four FPS capture frame rate, condition detection module 112 may detect a blur condition. In this example, each of the twelve image frames are associated with thirty degrees or more of capture device rotation which results in the blur condition.

Condition detection module 112 may determine, based on the sensor data of the capture device, a rate of capture device rotation associated with the plurality of image frames. In some embodiments, responsive to the rate of capture device rotation being greater than a first threshold rate of capture device rotation, less than a second threshold rate of capture device rotation, or a combination thereof, for at least the threshold number of image frames within the capture window, condition detection module 112 may detect a blur condition. For example, responsive to a rate of capture device rotation being greater than thirty degrees per second for at least twelve image frames of twenty-four image frames for a twenty-four FPS capture frame rate, condition detection module 112 may detect a blur condition. In this example, each of the twelve image frames are associated with thirty degrees per second or more of capture device rotation which results in the blur condition.

Condition detection module 112 may determine, based on the sensor data of the capture device, a degree of capture device translation associated with the plurality of image frames. In some embodiments, responsive to the degree of capture device translation being greater than a first threshold degree of capture device translation, less than a second threshold degree of capture device translation, or a combination thereof, for at least the threshold number of image frames within the capture window, condition detection module 112 may detect a blur condition. For example, responsive to a degree of capture device translation being greater than ten centimeters for at least twelve image frames of twenty-four image frames for a twenty-four FPS capture frame rate, condition detection module 112 may detect a blur condition. In this example, each of the twelve image frames are associated with ten centimeters or more of capture device translation which results in the blur condition.

Condition detection module 112 may determine, based on the sensor data of the capture device, a rate of capture device translation associated with the plurality of image frames. In some embodiments, responsive to the rate of capture device translation being greater than a first threshold rate of capture device translation, less than a second threshold rate of capture device translation, or a combination thereof, for at least the threshold number of image frames within the capture window, condition detection module 112 may detect a blur condition. For example, responsive to a rate of capture device translation being greater than ten centimeters per second for at least twelve image frames of twenty-four image frames for a twenty-four FPS capture frame rate, condition detection module 112 may detect a blur condition. In this example, each of the twelve image frames are associated with ten centimeters per second or more of capture device translation which results in the blur condition.

Condition detection module 112 may determine, based on the sensor data of the capture device, scene depth associated with the plurality of image frames. In some embodiments, responsive to the scene depth being greater than a first threshold scene depth, less than a second threshold scene depth, or a combination thereof, for at least the threshold number of image frames within the capture window, condition detection module 112 may detect a blur condition.

Image frame augmentation module 114 may be configured to, responsive to detecting the blur condition, providing an augmentation for at least one image frame of the plurality of image frames based on the sensor data. Image frame augmentation module 114 may be configured to apply the augmentation to the at least one image frame of the plurality of image frames. In some embodiments, augmentation for the at least one image frame includes darkening, blurring, pixelating including but not limited to downsampling, and the like. In some embodiments, image frame augmentation module 114 may provide augmentation for and/or apply the augmentation to the at least one image frame and temporally subsequent image frames.

Image frame display module 116 may be configured to display, on a display of the capture device, the at least one augmented image frame. The display of the at least one augmented image frame may provide immediate feedback to a user of the capture device. This proactive approach ensures the user is aware of the detected blur condition and provides an opportunity to the user to respond accordingly. The display of the at least one augmented image frame may convey to the user that a blur condition is detected.

Notification display module 118 may be configured to display, on the display of the capture device, a notification based, at least in part, on the detected blur condition, the sensor data, or a combination thereof. The display of the notification may provide immediate feedback to the user. This proactive approach ensures the user is aware of the detected blur condition and provides an opportunity to the user to respond accordingly. The display of the notification may convey to a user of the capture device that a blur condition is detected.

Capture function disablement module 120 may be configured to disable a capture function of the capture device based, at least in part, on the detected blur condition, the sensor data, or a combination thereof. In some embodiments, the capture function may be a physical button of the capture device. In some embodiments, the capture function may be a digital button of the capture device, such as a software-based capture button on a touchscreen interface of the capture device. Disablement of the capture function may provide immediate feedback to the user. This proactive approach ensures the user is aware of the detected blur condition and provides an opportunity to the user to respond accordingly. Disablement of the capture function may prevent the user from capturing image frames while the blur condition is detected.

Upon the user realizing the system has detected or is detecting a blur condition, for example through the display of the at least one augmented image frame, the display of the notification, the disablement of the capture function, or a combination thereof, the user may take action to stop the blur condition. The user may take action by changing camera functions, user functions, scene functions, or a combination thereof. One example that may stop the blur condition includes changing movement of the capture device such as rotation, translation, or a combination thereof. This example may include making the capture device subject to less jarring changes. Another example that may stop the blur condition includes making an environment subject to capture brighter such as by opening blinds or turning on lights. Yet another example that may stop the blur condition includes changing a distance between the capture device and an environment, or portions thereof, subject to capture.

Image frame storing module 122 may be configured to store image frames. In some embodiments, image frame storing module 112 may be configured to distinguish image frames that correspond to when the blur condition was detected, met, or satisfied. In some embodiments, image frame storing module 112 may store a least blurry image frame of the image frames that correspond to when the blur condition was detected, met, or satisfied. In some embodiments, image frame storing module 112 may store an image frame that correspond to when no blur condition was detected, met, or satisfied. In some embodiments, image frame storing module 112 may store sensor data associated with the image frames.

In some implementations, computing platform(s) 102, remote platform(s) 104, and/or external resources 124 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 102, remote platform(s) 104, and/or external resources 124 may be operatively linked via some other communication media.

A given remote platform 104 may include one or more processors configured to execute computer program modules. The computer program modules may be configured to enable an expert or user associated with the given remote platform 104 to interface with system 100 and/or external resources 124, and/or provide other functionality attributed herein to remote platform(s) 104. By way of non-limiting example, a given remote platform 104 and/or a given computing platform 102 may include one or more of a server, a desktop computer, a laptop computer, a handheld computer, a tablet computing platform, a NetBook, a Smartphone, a gaming console, and/or other computing platforms.

External resources 124 may include sources of information outside of system 100, external entities participating with system 100, and/or other resources. In some implementations, some or all of the functionality attributed herein to external resources 124 may be provided by resources included in system 100.

Computing platform(s) 102 may include electronic storage 126, one or more processors 128, and/or other components. Computing platform(s) 102 may include communication lines, or ports to enable the exchange of information with a network and/or other computing platforms. Illustration of computing platform(s) 102 in FIG. 1 is not intended to be limiting. Computing platform(s) 102 may include a plurality of hardware, software, and/or firmware components operating together to provide the functionality attributed herein to computing platform(s) 102. For example, computing platform(s) 102 may be implemented by a cloud of computing platforms operating together as computing platform(s) 102.

Electronic storage 126 may comprise non-transitory storage media that electronically stores information. The electronic storage media of electronic storage 126 may include one or both of system storage that is provided integrally (i.e., substantially non-removable) with computing platform(s) 102 and/or removable storage that is removably connectable to computing platform(s) 102 via, for example, a port (e.g., a USB port, a firewire port, etc.) or a drive (e.g., a disk drive, etc.). Electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 126 may include one or more virtual storage resources (e.g., cloud storage, a virtual private network, and/or other virtual storage resources). Electronic storage 126 may store software algorithms, information determined by processor(s) 128, information received from computing platform(s) 102, information received from remote platform(s) 104, and/or other information that enables computing platform(s) 102 to function as described herein.

Processor(s) 128 may be configured to provide information processing capabilities in computing platform(s) 102. As such, processor(s) 128 may include one or more of a digital processor, an analog processor, a digital circuit designed to process information, an analog circuit designed to process information, a state machine, and/or other mechanisms for electronically processing information. Although processor(s) 128 is shown in FIG. 1 as a single entity, this is for illustrative purposes only. In some implementations, processor(s) 128 may include a plurality of processing units. These processing units may be physically located within the same device, or processor(s) 128 may represent processing functionality of a plurality of devices operating in coordination. Processor(s) 128 may be configured to execute modules 108, 110, 112, 114, 116, 118, 120, and/or 122, and/or other modules. Processor(s) 128 may be configured to execute modules 108, 110, 112, 114, 116, 118, 120, and/or 122, and/or other modules by software; hardware; firmware;

some combination of software, hardware, and/or firmware; and/or other mechanisms for configuring processing capabilities on processor(s) 128. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, 116, 118, 120, and/or 122 are illustrated in FIG. 1 as being implemented within a single processing unit, in implementations in which processor(s) 128 includes multiple processing units, one or more of modules 108, 110, 112, 114, 116, 118, 120, and/or 122 may be implemented remotely from the other modules. The description of the functionality provided by the different modules 108, 110, 112, 114, 116, 118, 120, and/or 122 described below is for illustrative purposes, and is not intended to be limiting, as any of modules 108, 110, 112, 114, 116, 118, 120, and/or 122 may provide more or less functionality than is described. For example, one or more of modules 108, 110, 112, 114, 116, 118, 120, and/or 122 may be eliminated, and some or all of its functionality may be provided by other ones of modules 108, 110, 112, 114, 116, 118, 120, and/or 122. As another example, processor(s) 128 may be configured to execute one or more additional modules that may perform some or all of the functionality attributed below to one of modules 108, 110, 112, 114, 116, 118, 120, and/or 122.

Figure 2:
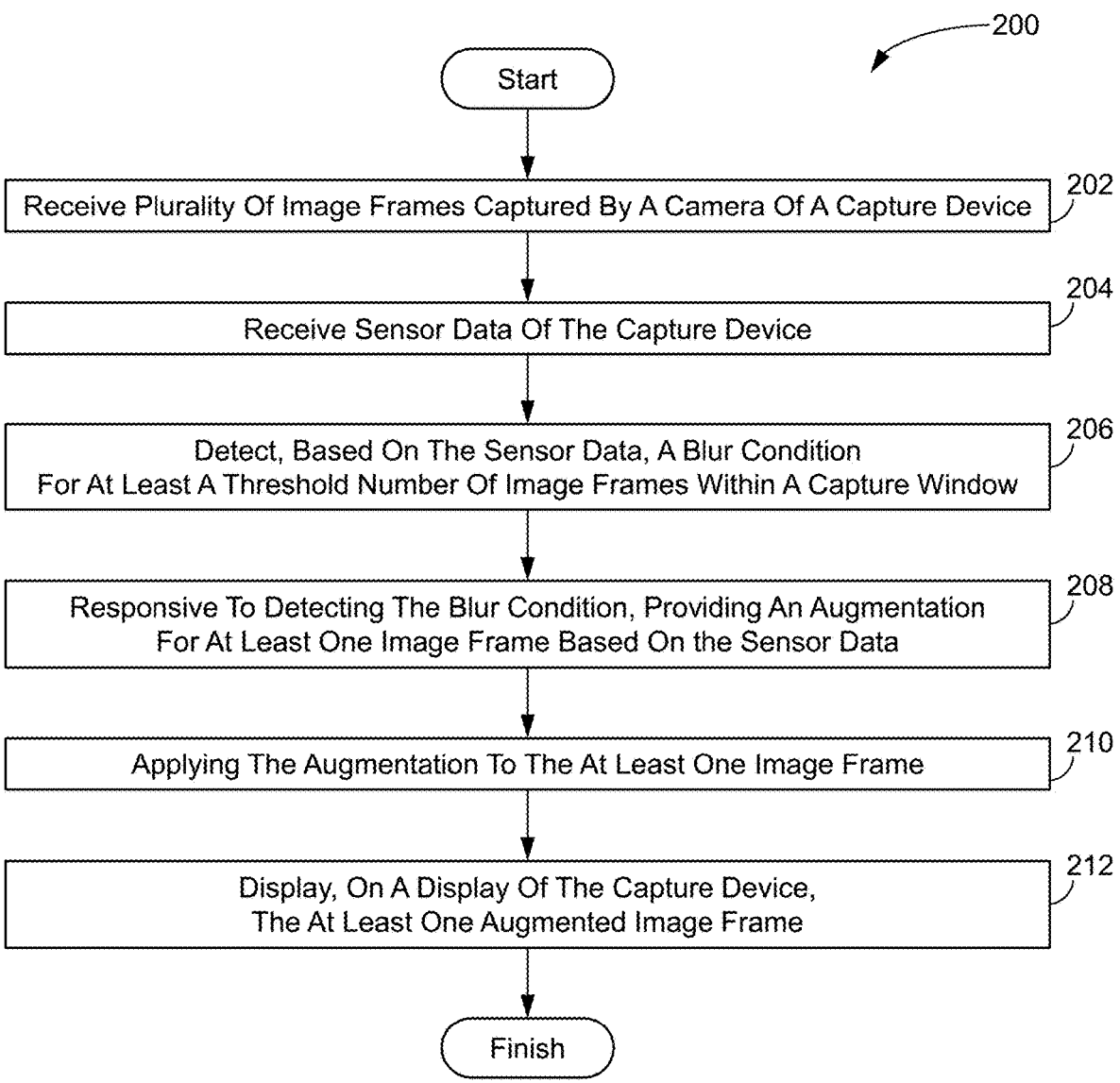
FIG. 2 illustrates a method for detecting a persisting or sustained blur condition across 2D image frames captured for a 3D reconstruction pipeline, according to some embodiments.

FIG. 2 illustrates a method 200 for detecting a persisting or sustained blur condition across 2D image frames captured for a 3D reconstruction pipeline, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include receiving a plurality of image frames captured by a camera of a capture device. The plurality of image frames may be 2D image frames. The plurality of image frames are captured at a capture frame rate. Examples of capture frame rates include three frames per second (FPS), four FPS, six FPS, eight FPS, twelve FPS, twenty-four FPS, and the like. The capture device may be handheld, such as a smartphone/mobile device, a tablet computer, a headset, and the like. Operation 202 may be performed by one or more hardware processors configured by machine-readable instructions including a module that is the same as or similar to image frame receiving module 108, in accordance with one or more implementations.

An operation 204 may include receiving sensor data of the capture device. The sensor data is associated with the plurality of image frames and related to the capture frame rate. The sensor data provides necessary information to detect a blur condition. By way of non-limiting example, the sensor data may include at least one of inertial sensor data, accelerometer sensor data, gyroscope sensor data, magnetometer sensor data, light sensor data, camera sensor data, depth data, and the like. The sensor data may be associated with the plurality of image frames. The sensor data may encompass a wide array of measurements from different types of sensors such as inertial measurement units (IMUs), accelerometers, gyroscopes, magnetometers, light sensors, camera sensors, depth sensors, and the like. Operation 204 may be performed by one or more hardware processors configured by machine-readable instructions including a module that is the same as or similar to sensor data receiving module 110, in accordance with one or more implementations.

An operation 206 may include detecting, based on the sensor data, a blur condition for at least a threshold number of image frames within a capture window, where the blur condition and the threshold number of image frames are proportional to the capture frame rate. In other words, operation 206 may include determining when a blur condition has persisted for at least a threshold number of image frames within a capture window. A blur condition may manifest relative to camera functions (e.g., shutter speed), user functions (e.g., capture device rotation and/or translation), scene functions (e.g., lighting, depth, etc.), or a combination thereof that may result in a blurry image. Image processing to determine pixel resolution or sampling quality of visual data for an image frame may be supplanted wholly or in part with sensor data for a capture device relative to a plurality of frames. Detecting a blur condition at time of capture of image frames may be used to prevent blurry images from being stored and used downstream, such as for 3D reconstruction. Operation 206 may be performed by one or more hardware processors configured by machine-readable instructions including a module that is the same as or similar to condition detection module 112, in accordance with one or more implementations.

The threshold number of image frames may be proportional to the capture frame rate. In some examples, if the capture frame rate is twenty-four FPS, the threshold number of image frames may be twelve image frames and the capture window may be twenty-four image frames. In these examples, operation 206 may include detecting a blur condition for at least twelve image frames within twenty-four image frames (e.g., the last twenty-four image frames). In some examples, if the capture frame rate is three FPS, the threshold number of image frames may be two image frames, and the capture window may be three image frames. In these examples, operation 206 may include detecting a blur condition for at least two image frames within three image frames (e.g., the last three image frames). In some embodiments, the threshold number of image frames may be different for camera functions, user functions, scene functions, or a combination thereof.

In some embodiments, operation 206 may include using correlations between camera functions, user functions, scene functions, or a combination thereof, and image blur to determine a blur condition. In some embodiments, operation 206 may include computing image blur for an image using one or more signal processing techniques such as, for example, computing a Fast Fourier Transforms (FFTs) of the image and examining a distribution of low and high frequencies, computing a convolution of a Laplacian kernel across the image and computing a variance of the response, and the like. If the computed image blur is greater than an image blur threshold, operation 206 may include classifying the image as being blurry.

Operation 206 may include determining, based on the sensor data of the capture device, a shutter speed associated with the plurality of images. Responsive to the shutter speed being slower than a threshold shutter speed for at least the threshold number of image frames within the capture window, operation 206 may include detecting the blur condition. The threshold shutter speed may be proportional to the capture frame rate. For example, responsive to the shutter speed being slower than $\frac{1}{60}$th of a second, which may be considered a threshold for handheld photography, for at least twelve image frames of twenty-four image frames for a twenty-four FPS capture frame rate, operation 206 may include detecting a blur condition. In this example, each of the twelve image frames are associated with $\frac{1}{60}$th or slower shutter speed which results in the blur condition.

Operation 206 may include determining, based on the sensor data of the capture device, a degree of capture device rotation associated with the plurality of image frames. In some embodiments, responsive to the degree of capture device rotation being greater than a first threshold degree of capture device rotation, less than a second threshold degree of capture device rotation, or a combination thereof, for at least the threshold number of image frames within the capture window, operation 206 may include detecting a blur condition. For example, responsive to a degree of capture device rotation being greater than thirty degrees for at least twelve image frames of twenty-four image frames for a twenty-four FPS capture frame rate, operation 206 may include detecting a blur condition. In this example, each of the twelve image frames are associated with thirty degrees or more of capture device rotation which results in the blur condition.

Operation 206 may include determining, based on the sensor data of the capture device, a rate of capture device rotation associated with the plurality of image frames. In some embodiments, responsive to the rate of capture device rotation being greater than a first threshold rate of capture device rotation, less than a second threshold rate of capture device rotation, or a combination thereof, for at least the threshold number of image frames within the capture window, operation 206 may include detecting a blur condition. For example, responsive to a rate of capture device rotation being greater than thirty degrees per second for at least twelve image frames of twenty-four image frames for a twenty-four FPS capture frame rate, operation 206 may include detecting a blur condition. In this example, each of the twelve image frames are associated with thirty degrees per second or more of capture device rotation which results in the blur condition.

Operation 206 may include determining, based on the sensor data of the capture device, a degree of capture device translation associated with the plurality of image frames. In some embodiments, responsive to the degree of capture device translation being greater than a first threshold degree of capture device translation, less than a second threshold degree of capture device translation, or a combination thereof, for at least the threshold number of image frames within the capture window, operation 206 may include detecting a blur condition. For example, responsive to a degree of capture device translation being greater than ten centimeters for at least twelve image frames of twenty-four image frames for a twenty-four FPS capture frame rate, operation 206 may include detecting a blur condition. In this example, each of the twelve image frames are associated with ten centimeters or more of capture device translation which results in the blur condition.

Operation 206 may include determining, based on the sensor data of the capture device, a rate of capture device translation associated with the plurality of image frames. In some embodiments, responsive to the rate of capture device translation being greater than a first threshold rate of capture device translation, less than a second threshold rate of capture device translation, or a combination thereof, for at least the threshold number of image frames within the capture window, operation 206 may include detecting a blur condition. For example, responsive to a rate of capture device translation being greater than ten centimeters per second for at least twelve image frames of twenty-four image frames for a twenty-four FPS capture frame rate, operation 206 may include detecting a blur condition. In this example, each of the twelve image frames are associated with ten centimeters per second or more of capture device translation which results in the blur condition.

Operation 206 may include determining, based on the sensor data of the capture device, scene depth associated with the plurality of image frames. In some embodiments, responsive to the scene depth being greater than a first threshold scene depth, less than a second threshold scene depth, or a combination thereof, for at least the threshold number of image frames within the capture window, operation 206 may include detecting a blur condition.

An operation 208 may include responsive to detecting the blur condition, providing an augmentation for at least one image frame of the plurality of image frames based on the sensor data. Operation 208 may be performed by one or more hardware processors configured by machine-readable instructions including a module that is the same as or similar to image frame augmentation module 114, in accordance with one or more implementations. An operation 210 may include applying the augmentation to the at least one image frame of the plurality of image frames. Operation 210 may be performed by one or more hardware processors configured by machine-readable instructions including a module that is the same as or similar to image frame augmentation module 114, in accordance with one or more implementations.

In some embodiments, augmentation for the at least one the image frame may include darkening, blurring, pixelating including but not limited to downsampling, and the like. In some embodiments, operations 208 and/or 210 may include providing augmentation for and/or applying augmentation to at least one image frame and temporally subsequent image frames.

An operation 212 may include displaying, on a display of the capture device, the at least one augmented image frame. The display of the at least one augmented image frame may provide immediate feedback to a user of the capture device. This proactive approach ensures the user is aware of the detected blur condition and provides an opportunity to the user to respond accordingly. The display of the at least one augmented image frame may convey to the user that a blur condition is detected. Operation 212 may be performed by one or more hardware processors configured by machine-readable instructions including a module that is the same as or similar to image frame display module 116, in accordance with one or more implementations.

In some embodiments, the method 200 may further include one or more additional operations such as displaying, on the display of the capture device, a notification based, at least in part, on the detected blur condition, the sensor data, or a combination thereof. The display of the notification may provide immediate feedback to the user. This proactive approach ensures the user is aware of the detected blur condition and provides an opportunity to the user to respond accordingly. The display of the notification may convey to a user of the capture device that a blur condition is detected. This operation may be performed by one or more hardware processors configured by machine-readable instructions including a module that is the same as or similar to notification display module 118, in accordance with one or more implementations.

In some embodiments, the method 200 may further include disabling a capture function of the capture device based, at least in part, on the detected blur condition, the sensor data, or a combination thereof. In some embodiments, the capture function may be a physical button of the capture device. In some embodiments, the capture function may be a digital button of the capture device, such as a software-based capture button on a touchscreen interface of the capture device. Disablement of the capture function may provide immediate feedback to the user. This proactive approach ensures the user is aware of the detected blur condition and provides an opportunity to the user to respond accordingly. Disablement of the capture function may prevent the user from capturing image frames while the blur condition is detected. This operation may be performed by one or more hardware processors configured by machine-readable instructions including a module that is the same as or similar to capture function disablement module 120, in accordance with one or more implementations.

Upon the user realizing the system has detected or is detecting a blur condition, for example through the display of the at least one augmented image frame, the display of the notification, the disablement of the capture function, or a combination thereof, the user may take action to stop the blur condition. The user may take action by changing camera functions, user functions, scene functions, or a combination thereof. One example that may stop the blur condition includes changing movement of the capture device such as rotation, translation, or a combination thereof. This example may include making the capture device subject to less jarring changes. Another example that may stop the blur condition includes making an environment subject to capture brighter such as by opening blinds or turning on lights. Yet another example that may stop the blur condition includes changing a distance between the capture device and an environment, or portions thereof, subject to capture.

In some embodiments, the method 200 may further include storing image frames. This operation may be performed by one or more hardware processors configured by machine-readable instructions including a module that is the same as or similar to image frame storing module 122, in accordance with one or more implementations. In some embodiments, image frames that correspond to when the blur condition was detected, met, or satisfied, may be distinguished. In some embodiments, a least blurry image frame of the image frames that correspond to when the blur condition was detected, met, or satisfied, may be stored. In some embodiments, this operation may store an image frame that corresponds to when no blur condition was detected, met, or satisfied. In some embodiments, sensor data associated with the image frames may be stored.

Figure 3A:
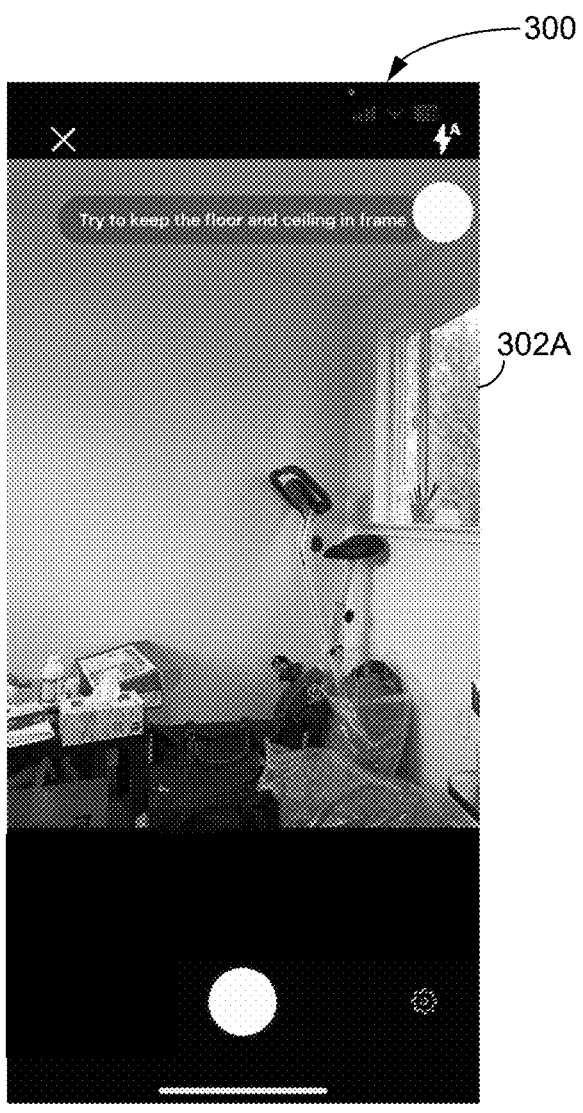
FIGS. 3A-3C illustrate a display of a capture device, according to various embodiments.
Figure 3B:
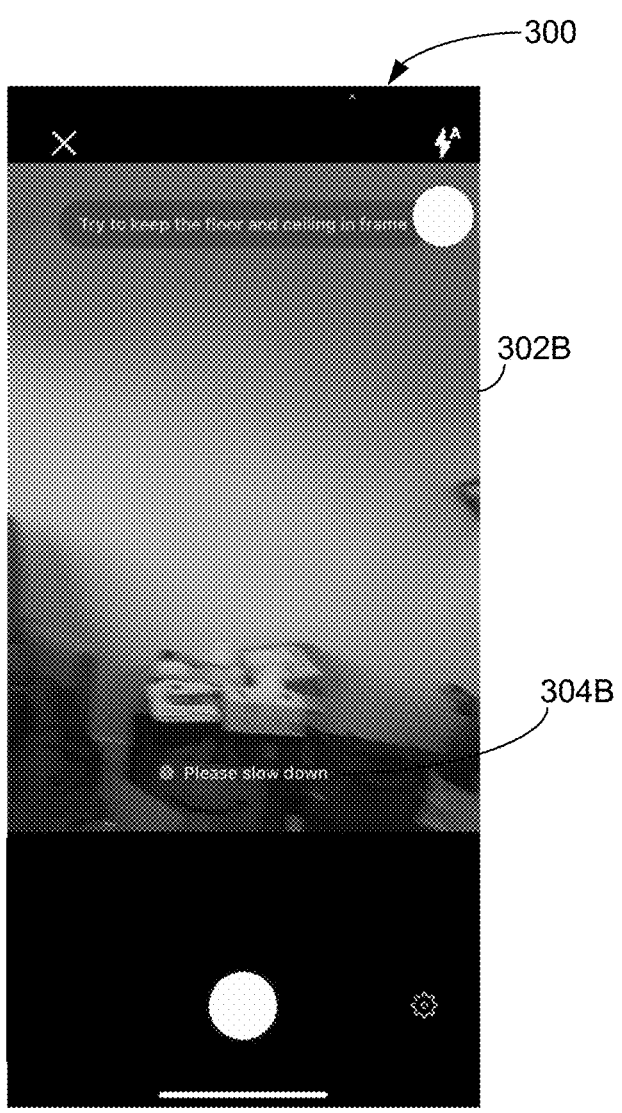
Figure 3C:
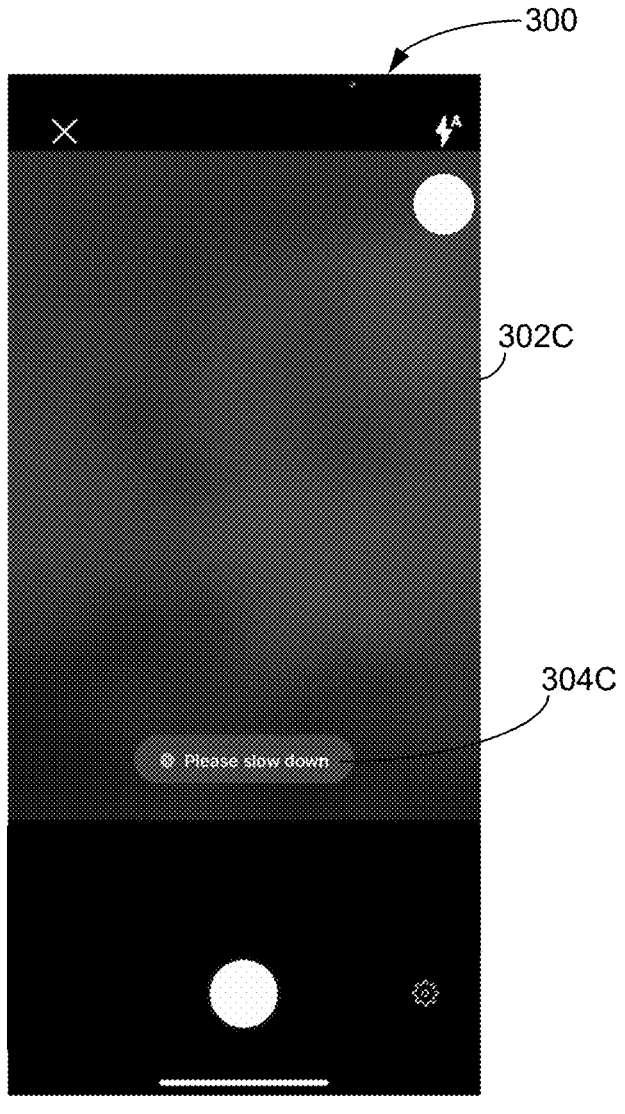

FIGS. 3A-3C illustrate a display 300 of a capture device, according to various embodiments. FIG. 3A illustrates display 300 including image frame 302A, FIG. 3B illustrates display 300 including image frame 302B, and FIG. 3C illustrates display 300 including image frame 302C. A plurality of image frames, such as image frames 302A, 302B, and 302C, captured by a camera of the capture device may be received. Image frames 302A, 302B, and 302C may be temporally sequential image frames where image frame 302A is a first image in the sequence, image frame 302B is a second image in the sequence, and image frame 302C is a third image in the sequence. In some embodiments, there may be additional image frames between image frames 302A, 302B, and 302C. Sensor data of the capture device may be received. The plurality of image frames may be displayed on display 300. In some embodiments, captured image frames are displayed (i.e., image frames without augmentation applied). In some embodiments, augmented image frames are displayed (i.e., image frames with augmentation applied). The sensor data is associated with the plurality of image frames. Image frame 302A illustrates an as captured image frame with no image blur. A blur condition for at least a threshold number of image frames within a capture window may be detected based on sensor data of the capture device. Image frame 302B illustrates an image frame with augmentation applied thereto, in the form of blurring, and includes notification 304B that provides instructions to a user of the capture device. The augmentation applied to image frame 302B may be based on sensor data associated with image frame 302B. Image frame 302C illustrates an image frame with augmentation applied thereto, in the form of blurring, and includes notification 304C that provides instructions to the user of the capture device. The augmentation applied to image frame 302C may be based on sensor data associated with image frame 302C.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method of detecting a sustained blur condition across two-dimensional image frames captured for a three-dimensional reconstruction pipeline, the method comprising:

receiving a plurality of image frames captured by a camera of a capture device, wherein the plurality of image frames are captured at a capture frame rate;

receiving sensor data of the capture device, wherein the sensor data is associated with the plurality of image frames and related to the capture frame rate;

detecting, based on the sensor data of the capture device, a blur condition for at least a threshold number of image frames within a capture window, wherein the blur condition and the threshold number of image frames are proportional to the capture frame rate;

responsive to detecting the blur condition, providing an augmentation for at least one image frame of the plurality of image frames within the capture window based on the sensor data, wherein the augmentation includes modified pixel data of the at least one image frame;

applying the augmentation to the at least one image frame of the plurality of image frames within the capture window; and displaying, on a display of the capture device, the at least one augmented image frame.

2. The method of claim 1, wherein the sensor data comprises at least one of inertial sensor data, accelerometer sensor data, gyroscope sensor data, and magnetometer sensor data.

3. The method of claim 1, wherein detecting the blur condition comprises:

determining, based on the sensor data of the capture device, a degree of capture device rotation associated with the plurality of image frames, and responsive to the degree of capture device rotation being greater than a first threshold degree of capture device rotation for at least the threshold number of image frames within the capture window, detecting the blur condition, wherein the first threshold degree of capture device rotation is proportional to the capture frame rate.

4. The method of claim 1, wherein detecting the blur condition comprises:

determining, based on the sensor data of the capture device, a degree of capture device rotation associated with the plurality of image frames, and responsive to the degree of capture device rotation being less than a second threshold degree of capture device rotation for at least the threshold number of image frames within the capture window, detecting the blur condition, wherein the second threshold degree of capture device rotation is proportional to the capture frame rate.

5. The method of claim 1, wherein detecting the blur condition comprises:

determining, based on the sensor data of the capture device, a rate of capture device rotation associated with the plurality of image frames, and responsive to the rate of capture device rotation being greater than a first threshold rate of capture device rotation for at least the threshold number of image frames within the capture window, detecting the blur condition, wherein the first threshold rate of capture device rotation is proportional to the capture frame rate.

6. The method of claim 1, wherein detecting the blur condition comprises:

determining, based on the sensor data of the capture device, a rate of capture device rotation associated with the plurality of image frames, and responsive to the rate of capture device rotation being less than a second threshold rate of capture device rotation for at least the threshold number of image frames within the capture window, detecting the blur condition, wherein the second threshold rate of capture device rotation is proportional to the capture frame rate.

7. The method of claim 1, wherein detecting the blur condition comprises:

determining, based on the sensor data of the capture device, a degree of capture device translation associated with the plurality of image frames, and responsive to the degree of capture device translation being greater than a first threshold degree of capture device translation for at least the threshold number of image frames within the capture window, detecting the blur condition, wherein the first threshold degree of capture device translation is proportional to the capture frame rate.

8. The method of claim 1, wherein detecting the blur condition comprises:

determining, based on the sensor data of the capture device, a degree of capture device translation associated with the plurality of image frames, and responsive to the degree of capture device translation being less than a second threshold degree of capture device translation for at least the threshold number of image frames within the capture window, detecting the blur condition, wherein the second threshold degree of capture device translation is proportional to the capture frame rate.

9. The method of claim 1, wherein detecting the blur condition comprises:

determining, based on the sensor data of the capture device, a rate of capture device translation associated with the plurality of image frames, and responsive to the rate of capture device translation being greater than a first threshold rate of capture device translation for at least the threshold number of image frames within the capture window, detecting the blur condition, wherein the first threshold rate of capture device translation is proportional to the capture frame rate.

10. The method of claim 1, wherein detecting the blur condition comprises:

determining, based on the sensor data of the capture device, a rate of capture device translation associated with the plurality of image frames, and responsive to the rate of capture device translation being less than a second threshold rate of capture device translation for at least the threshold number of image frames within the capture window, detecting the blur condition, wherein the second threshold rate of capture device translation is proportional to the capture frame rate.

11. The method of claim 1, wherein the augmentation for the at least one image frame comprises darkening of the at least one image frame.

12. The method of claim 1, wherein the augmentation for the at least one image frame comprises blurring of the at least one image frame.

13. The method of claim 1, wherein the augmentation for the at least one image frame comprises pixelating of the at least one image frame.

14. The method of claim 1, further comprising displaying, on the display of the capture device, a notification based, at least in part, on the detected blur condition.

15. The method of claim 1, further comprising disabling a capture function of the capture device based, at least in part, on the detected blur condition.

16. The method of claim 1, further comprising storing plurality of image frames.

17. The method of claim 1, further comprising responsive to detecting the blur condition, distinguishing the plurality of image frames.

18. The method of claim 1, further comprising:

responsive to detecting the blur condition, determining an image frame of the plurality of image frames corresponding to least blur; and storing the image frame.

19. A method of detecting a blur condition in two-dimensional image frames, the method comprising:

receiving a plurality of image frames captured by a camera of a capture device, wherein the plurality of image frames are captured at a capture frame rate;

receiving sensor data of the capture device, wherein the sensor data is associated with the plurality of image frames and related to the capture frame rate;

detecting, based on the sensor data of the capture device, a blur condition across a plurality of image frames within a capture window, wherein the blur condition is related to a capture device function;

responsive to detecting the blur condition, providing an augmentation for at least one image frame of the plurality of captured image frames based on the sensor data, wherein the augmentation modifies image data of the at least one image frame;

applying the augmentation to the at least one image frame of the plurality of captured image frames; and displaying, on a display of the capture device, the at least one augmented image frame.

20. The method of claim 19, wherein the capture device function is the capture frame rate, and the blur condition and number of image frames of the plurality of image frames is proportional to the capture frame rate.

21. A method of detecting a sustained blur condition across two-dimensional image frames captured for a three-dimensional reconstruction pipeline, the method comprising:

receiving a plurality of image frames captured by a camera of a capture device, wherein the plurality of image frames are captured at a capture frame rate;

receiving sensor data of the capture device, wherein the sensor data is associated with the plurality of image frames and related to the capture frame rate;

detecting, based on the sensor data of the capture device, a blur condition for at least a threshold number of image frames within a capture window, wherein the blur condition and the threshold number of image frames are proportional to the capture frame rate;

responsive to detecting the blur condition, providing an augmentation for at least one image frame of the plurality of captured image frames based on the sensor data, wherein the augmentation modifies image data of the at least one image frame;

applying the augmentation to the at least one image frame of the plurality of captured image frames; and displaying, on a display of the capture device, the at least one augmented image frame.

* * * * *